US006771642B1

(12) United States Patent
Seaver et al.

(10) Patent No.: US 6,771,642 B1
(45) Date of Patent: *Aug. 3, 2004

(54) METHOD AND APPARATUS FOR SCHEDULING PACKETS IN A PACKET SWITCH

(75) Inventors: Terry R. Seaver, Pleasanton, CA (US); Khuong Hoang Ngo, San Jose, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,118

(22) Filed: Jan. 8, 1999

(51) Int. Cl.⁷ ............................................... H04L 12/50

(52) U.S. Cl. ...................... 370/360; 370/229; 370/389; 370/390; 370/412; 370/415; 370/416; 370/432

(58) Field of Search ............................... 370/229, 389, 370/390, 412, 415, 416, 432, 360

(56) References Cited

U.S. PATENT DOCUMENTS

| | | | |
|---|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |

(List continued on next page.)

FOREIGN PATENT DOCUMENTS

| | | |
|---|---|---|
| EP | 0 384 758 A2 | 8/1990 |
| EP | 0 431 751 A1 | 6/1991 |
| EP | 0 567 217 A2 | 10/1993 |
| WO | WO 93/07569 A1 | 4/1993 |
| WO | WO 93/07692 A1 | 4/1993 |
| WO | WO 94/01828 A1 | 1/1994 |
| WO | WO 95/20850 A1 | 8/1995 |

OTHER PUBLICATIONS

Balaji Prabhakar, Nick McKeown, Ritesh Ahuja. "Multicast Scheduling for Input–Queued Switches". Hewlett–Packard Labs, Bristol, Stanford University.

Terry Seaver. "Optimized Multicast Arbitration for Warbirds". Cisco Systems, Mar. 13, 1996.

William Stallings, Data and Computer Communications, pp. 329–333, Prentice Hall, Upper Saddle river, New Jersey 07458.

(List continued on next page.)

*Primary Examiner*—Hassan Kizou
*Assistant Examiner*—Joe Logsdon
(74) *Attorney, Agent, or Firm*—Hickman Palermo Truong & Becker LLP

(57) ABSTRACT

The present invention reduces the number of multicast synchronization delays in a packet switch by determining the mix of packets pending at the input ports. When a sufficient number of multicast packets are ready for transferal, the packet switch preferably transmits a programmed number of multicast packets (or as many multicast packets that exist up to that programmed number). After transmitting these multicast packets, the packet switch resumes preferably transmitting unicast packets. Thus, the number of multicast synchronization delays is reduced over the prior art, the bandwidth utilization of the packet switch is correspondingly increased and the load due to multicast packets and unicast packet is balanced. One embodiment of the invention includes a timer that ensures that multicast packets are transmitted without undue delay.

26 Claims, 6 Drawing Sheets

U.S. PATENT DOCUMENTS

| | | |
|---|---|---|
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckerberg, Jr. et al. |
| 4,769,811 A | 9/1988 | Eckerberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,304 A | 1/1990 | Giacopelli et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,767 A | 10/1990 | Kinoshita et al. |
| 4,965,772 A | 10/1990 | Daniel et al. |
| 4,970,678 A | 11/1990 | Sladowski et al. |
| 4,979,118 A | 12/1990 | Kheradpir ................. 364/436 |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,034,919 A | 7/1991 | Sasai et al. |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,267,235 A | * 11/1993 | Thacker ..................... 370/396 |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. .......... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,396,491 A | * 3/1995 | Newman ..................... 370/355 |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,485,455 A | 1/1996 | Dobbins et al. |
| 5,490,140 A | 2/1996 | Absensour et al. |
| 5,490,258 A | 2/1996 | Fenner |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweazey |
| 5,509,006 A | 4/1996 | Wilford et al. |
| 5,517,494 A | 5/1996 | Green |
| 5,519,704 A | 5/1996 | Farinacci et al. |
| 5,519,858 A | 5/1996 | Walton et al. ............... 395/600 |
| 5,526,489 A | 6/1996 | Nilakantan et al. |
| 5,530,963 A | 6/1996 | Moore et al. |

| | | |
|---|---|---|
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,555,244 A | 9/1996 | Gupta et al. |
| 5,561,669 A | 10/1996 | Lenney et al. |
| 5,583,862 A | 12/1996 | Callon |
| 5,592,470 A | 1/1997 | Rudrapatna et al. |
| 5,598,581 A | 1/1997 | Daines et al. |
| 5,600,798 A | 2/1997 | Cherukuri et al. |
| 5,602,770 A | 2/1997 | Ohira |
| 5,604,868 A | 2/1997 | Komine et al. |
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |
| 5,632,021 A | 5/1997 | Jennings et al. |
| 5,634,010 A | 5/1997 | Ciscon et al. |
| 5,638,359 A | 6/1997 | Peltola et al. |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. |
| 5,684,797 A | 11/1997 | Aznar et al. |
| 5,687,324 A | 11/1997 | Green et al. |
| 5,689,506 A * | 11/1997 | Chiussi ............... 370/388 |
| 5,694,390 A | 12/1997 | Yamato et al. |
| 5,715,237 A | 2/1998 | Akiyoshi |
| 5,724,351 A | 3/1998 | Chao et al. |
| 5,740,097 A | 4/1998 | Satoh |
| 5,748,186 A | 5/1998 | Raman |
| 5,748,617 A | 5/1998 | McLain, Jr. |
| 5,754,547 A | 5/1998 | Nakazawa |
| 5,793,978 A | 8/1998 | Fowler |
| 5,802,054 A | 9/1998 | Bellenger |
| 5,835,710 A | 11/1998 | Nagami et al. |
| 5,841,874 A | 11/1998 | Kempke et al. |
| 5,854,903 A | 12/1998 | Morrison et al. |
| 5,856,981 A | 1/1999 | Voelker |
| 5,884,017 A | 3/1999 | Fee |
| 5,892,924 A | 4/1999 | Lyon et al. ............ 395/200.75 |
| 5,898,686 A | 4/1999 | Virgile |
| 5,903,559 A | 5/1999 | Acharya et al. |
| 5,983,223 A | 11/1999 | Perlman |
| 6,147,996 A | 11/2000 | Laor et al. |
| 6,188,690 B1 * | 2/2001 | Holden et al. ............ 370/390 |
| 6,212,182 B1 * | 4/2001 | McKeown ............ 370/390 |
| 6,307,855 B1 | 10/2001 | Hariguchi |
| 6,370,121 B1 | 4/2002 | Hausman |

OTHER PUBLICATIONS

M. Allen, "Novell IPX Over Various WAN Media (IPX-WAN)," Network Working Group, Request for Comments: 1551, Dec. 1993, pp. 1–13.

Donald Becker, "3C589.c: A 3c589 EthernetLink3 ethernet drive for linux," becker@CESDIS.gsfc.nasa.gov, May 3, 1994, pp. 1–13.

Shyamal Chowdhury, et al., "Alternative Bandwidth Allocation Algorithms for Packet Video in ATM Networks," INFOCOM 1992, pp. 1061–1068.

Willibald Doeringer, et al., "Routing on Longest–Matching Prefixes," IEEE/ACM Transactions in Networking, Feb. 1996, IEEE, vol. 4, No. 1, pp. 86–97.

Hiroshi Esaki, et al., "Datagram Delivery in an ATM–Internet," 2334b IEICE Transactions on Communications, Mar. 1994, No. 3, Tokyo, Japan, XP 000451005, pp. 314–326.

IBM Corporation, "Method and Apparatus for the Statistical Multiplexing of Voice, Data and Image Signals," IBM Technical Disclosure Bulletin, No. 6, Nov. 1992, pp. 409–411.

Tong–Bi Pei, et al., "Putting Routing Tables in Silicon," IEEE, Jan. 1992, pp. 42–50.

D. Perkins, "Requirements for an Internet Standard Point–to–Point Protocol," Network Working Group, Request for Comments: 1547, Dec. 1993, pp. 1–19.

W. Simpson, "The Point–to–Point Protocol (PPP)," Network Working Group, Request for Comments: 1548, Dec. 1993, pp. 1–53.

Paul F. Tsuchiya, "A Search Algorithm for Table Entries with Non–Contiguous Wildcarding," Abstract, Bellcore, 12 pages.

Hui Zhang, et al., "Rate–Controlled Static–Priority Queueing," INFOCOM 1993, pp. 227–236.

* cited by examiner

METHOD AND APPARATUS FOR SCHEDULING PACKETS IN A PACKET SWITCH

BACKGROUND OF THE INVENTION

1. Field of the Invention

This invention relates to the field of scheduling packets in a crossbar device.

2. Background

A typical crossbar switch includes multiple inputs and outputs. Packets that arrive at an input port are queued until the packet can be transferred to an output port. For purposes of the invention, there are two types of packets. A unicast packet contains addressing that selects only one output port of the packet switch. A multicast packet specifies multiple output ports of the packet switch.

When a unicast packet is pending, the packet's addressing information causes a unicast-packet-request signal to be sent the output port specified by the unicast packet. If the specified output port is free (or when it becomes free), a unicast arbiter for the output port selects and connects to a selected input port. The unicast packet is then transferred from the input port to the output port. Once the packet transfer is complete, the output port rearbitrates.

When a multicast is pending, a multicast-packet-request signals are sent by a multicast arbiter to each output port specified by the multicast packet at the input port. Once all the requested outputs are ready for the packet, the packet is simultaneously transferred to each output port. A single multicast arbiter is used for all the output ports.

One problem is related to how the output port should operate when both unicast- and multicast-packet-requests are pending at the output port. In a prior art implementation, the output has two states (unicast and multicast). Prior art packet switches can toggles between these states at the end of each transfer (if both unicast and multicast requests are pending), when the packet switch becomes totally blocked by pending multicast packets at the input ports, or in response to a timer. In prior art implementations, a synchronization delay occurs when the packet switch changes state. Thus, significant bandwidth utilization is lost every time the packet switch prepares to transfer a multicast packet. In addition, for the prior art implementations that switch state when the input ports are blocked, significant bandwidth utilization is lost as the input ports become blocked. Further, packets waiting for the blocked ports can be unacceptably delayed through the packet switch.

It would be advantageous to burst multiple multicast packets to increase the bandwidth utilization of the switch by reducing the number of multicast synchronization delays while limiting the delays caused by allowing the ports to become blocked by multicast packets.

SUMMARY OF THE INVENTION

The present invention reduces the number of multicast synchronization delays in a packet switch by determining the mix of packets pending at the input ports. When a sufficient number of multicast packets are ready for transferal, the packet switch preferably transmits a programmed number of multicast packets (or as many multicast packets that exist up to that programmed number). After transmitting these multicast packets, the packet switch resumes preferably transmitting unicast packets. Thus, the number of multicast synchronization delays is reduced over the prior art, the bandwidth utilization of the packet switch is correspondingly increased and the load due to multicast packets and unicast packet is balanced.

DESCRIPTION OF THE INVENTION EMBODIMENTS

Figure 1:
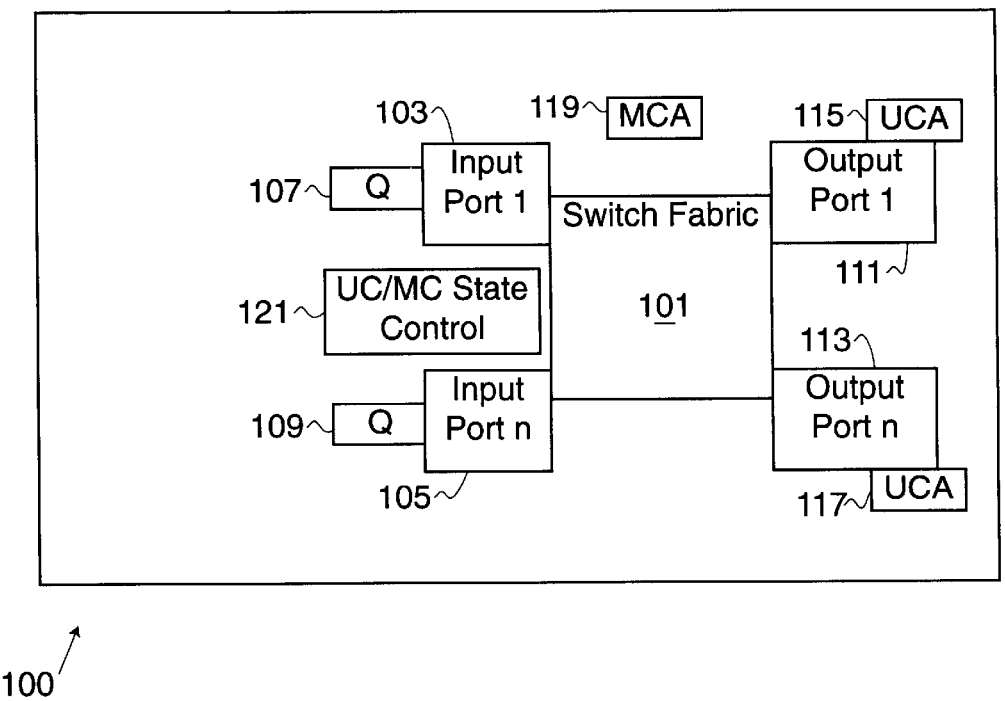
FIG. 1 illustrates a packet switch that transfers both unicast packets and multicast packets in accordance with a preferred embodiment.

FIG. 1 illustrates a packet switch, indicated by general reference character 100, configured to transfer packets through a switch fabric 101. The switch fabric 101 is connected to a first input port 103 and other input ports including an nth input port 105. The first input port 103 includes a first input queue 107 that can hold the data comprising one or more of the packets sent to the first input port 103. The nth input port 105 also includes an nth input queue 109 that can hold the data comprising one or more of the packets sent to the nth input port 105. One skilled in the art will understand that the nth input port 105 and the nth input queue 109 can be combined into one queue. The switch fabric 101 is configured to connect any of the input ports to a first output port 111, an nth output port 113 or any other output port dependent on the data contained within the packet. The first output port 111 is associated with a first unicast arbitrator 115 and the nth output port 113 is associated with an nth unicast arbitrator 117. The packet switch 100 also includes a multicast arbitrator 119 and a UC/MC state control 121.

A unicast packet at an input port causes a unicast-packet-request signal to be sent to the arbitrator of the output port specified by the content of the unicast packet. The output port arbitrator acknowledges the unicast-packet-request signal responsive to the unicast/multicast state maintained by the UC/MC state control 121 and the status of the packet requests from all the input ports and the multicast arbitrator 119.

However, a multicast packet at an input port causes the multicast arbitrator 119 to post a multicast-packet-request signal to the set of output ports specified by the multicast packet. When the unicast/multicast state is in the state of preferentially transferring unicast packets, the output port will select one of the input ports making a unicast request (if any) of the output port and send a ready reply to the selected input port instead of responding to the multicast arbitrator 119. When the unicast/multicast state is in the state of preferentially transferring multicast packets, the output port will send a ready reply to the multicast arbitrator 119. When all the specified set of output ports indicate ready to the multicast arbitrator 119 the multicast arbitrator conditions the switch fabric 101 for a multicast and causes the multicast packet at the input port to be transferred across the switch fabric 101 to the specified set of output ports.

The invention increases the bandwidth that can be utilized by the packet switch by reducing the overhead incurred by the packet switch when switching from the state of preferentially transferring unicast packets to the state of preferentially transferring multicast packets. The invention does this by determining when a sufficient number of multicast packets become ready for transferal at the input ports.

A multicast packet becomes blocked at the input port when one or more of the set of output ports that are specified by the multicast packet continues to be used for unicast packet transfers. These blocked multicast packets stop subsequent packets from being transferred from the blocked input port. By waiting for multiple multicast packets to become available for transferal, the overhead of switching state from preferentially transferring unicast packets to the state of preferentially transferring multicast packets is spread across the number of multicast packets that are transferred during this state. This increases the bandwidth utilization of the packet switch.

One skilled in the art will understand that if a multicast packet is at an input port, and the output ports requested by the multicast packet happen to be available, the multicast packet is transferred regardless of the preference state of the packet switch. However, as the load on the packet switch increases, this circumstance becomes less likely.

Figure 2:
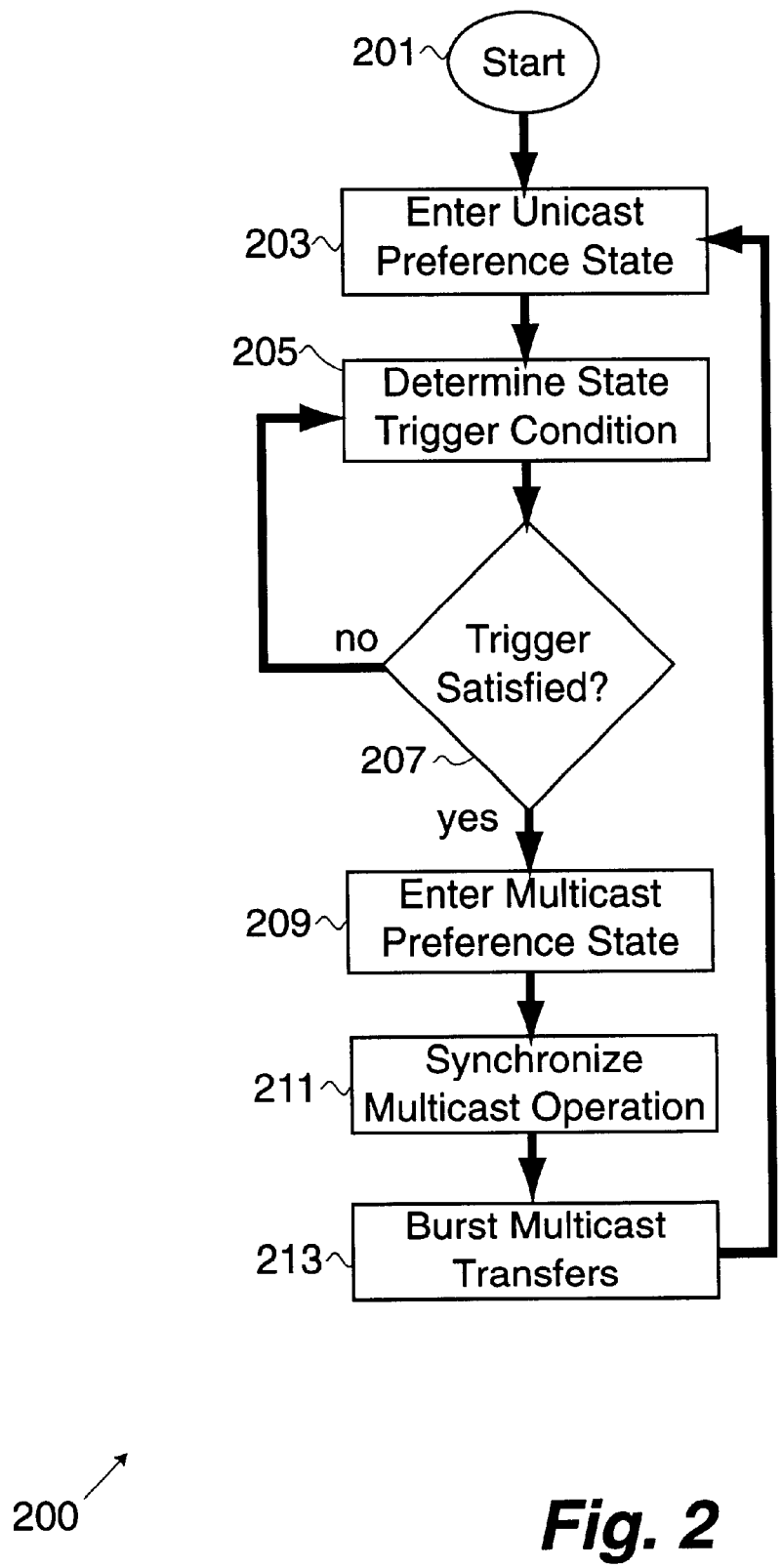
FIG. 2 illustrates a process for improving efficiency of a packet switch that transfers both unicast packets and multicast packets in accordance with a preferred embodiment.

FIG. 2 illustrates a process for switching between unicast and multicast preference states, indicated by general reference character 200, used to arbitrate between multicast packets and unicast packets. The process 200 initiates at a 'start' terminal 201 during the initialization of the packet switch. After the process 200 initiates, it continues to an 'enter unicast preference state' step 203. The 'enter unicast preference state' step 203 conditions the packet switch so that an output port arbitrator preferably responds to unicast-packet-request signals from the input ports instead of the multicast-packet-request signal from the multicast arbitrator. The process 200 continues to a 'determine state trigger condition' step 205 (subsequently described with respect to FIG. 3A, FIG. 3B, and FIG. 3C) that determines whether the preferential state should be changed from the unicast preference state set by the 'enter unicast preference state' step 203. If the 'trigger satisfied' decision step 207 determines that the preferential state should not be changed, the process 200 continues to the 'determine state trigger condition' step 205 that repeats the determination of the state trigger condition.

However, if the state trigger condition is satisfied at the 'trigger satisfied' decision step 207, the process 200 continues to an 'enter multicast preference state' step 209. The 'enter multicast preference state' step 209 changes the state of the packet switch from the unicast preference state to a multicast preference state. At this point, the output ports preferentially reply to the multicast-packet-request signal instead of to the unicast-packet-request signals from the input ports.

The process 200 continues to a 'synchronize packet switch for multicast operation' step 211 that waits (if required) until the selected output ports complete unicast packet transfers and become available for multicast packets. Once the packet switch completes synchronization, the process 200 continues to a 'burst multicast transfers' step 213 (subsequently described with respect to FIG. 4) that transfers a number of multicast packets. After the burst of multicast packets, the process 200 continues to the 'enter unicast preference state' step 203 that again places the packet switch into the unicast preference state. The process 200 then repeats these steps.

The 'determine state trigger condition' step 205 evaluates the mix of unicast and multicast packets at the input ports. Thus, when the number of multicast packets at the input ports becomes suitable for bursting multicast transfers (or if a single multicast pack becomes sufficiently delayed), the 'determine state trigger condition' step 205 satisfies the trigger used to switch the packet switch from the unicast preference state to the multicast preference state.

Figure 3A:
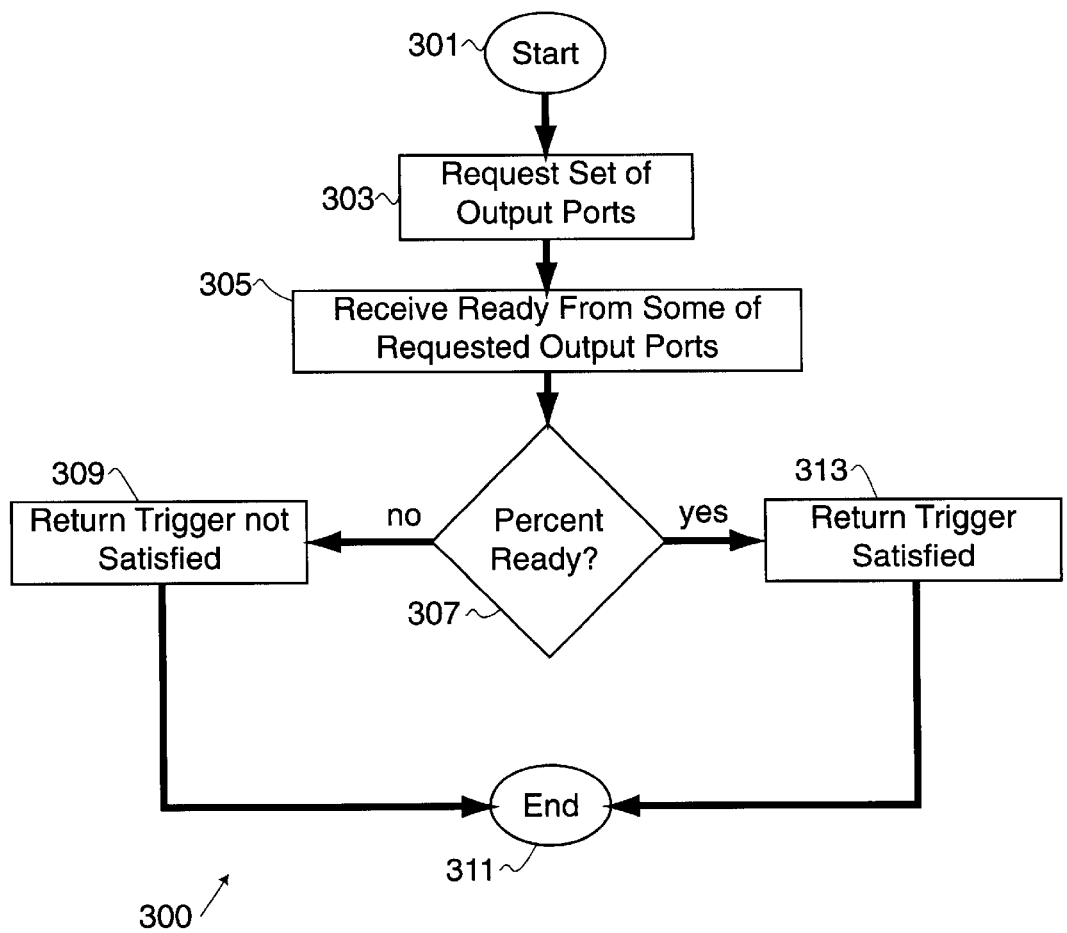
FIG. 3A illustrates one embodiment of the 'determine state trigger condition' step shown in FIG. 2.

FIG. 3A illustrates a first 'determine state trigger condition' process, indicated by general reference character 300, that can be used by the 'determine state trigger condition' step 205. This process uses the multicast arbitrator 119 to approximate the percentage of multicast packets that are blocking input ports. The multicast arbitrator 119 can determine this by requesting access to a specified set of output ports. If a sufficient number of these selected ports acknowledge the request, one of two conditions exists at the packet switch. The first condition occurs when the packet switch is under light load and the output ports are available because no other unicast or multicast packets have requested them. The second condition occurs when the packet switch is operating under a heavier load and multicast packets are waiting at the input ports for transferal through the packet switch (blocking subsequent packets). As more input ports are blocked by multicast packets, fewer unicast packets are processed by the packet switch as only the unblocked input ports are able to pass packets. Thus, the probability increases that a particular port is free as more input ports are blocked by multicast packets. (Remember, if a multicast packet is at an input port, and the requested set of output ports is free, the multicast packet will be transferred regardless of the preference state of the packet switch.)

The first process 300 is invoked by the 'determine state trigger condition' step 205 of FIG. 2 at a 'start' terminal 301. In this preferred embodiment, the first process 300 continues to a 'request output ports' step 303 that examines a multicast packet to determine the specified set of output ports for the multicast packet and sends a multicast-packet-request signal to the specified set of output ports. Each of the specified set of output ports determines whether the port is busy. If the port is busy, it does not respond with an output port ready reply; if the port is not busy, but has a pending unicast request, the port also does not respond with an output port ready reply (because the packet switch is in the unicast preference state (see the 'determine state trigger condition' step 205); otherwise, the port responds to the multicast arbiter with an output port ready reply. The multicast arbiter receives the ready replies (if any) from the specified set of output ports at a 'receive output port ready' step 305. If a sufficient percentage of the specified set of output ports do not respond with an output port ready reply, the first process 300 continues to a 'return FALSE' step 309 that indicates trigger unsatisfied to the 'trigger satisfied' decision step 207. The first process 300 then completes through an 'end' terminal 311. However if a sufficient number of the specified set of output ports respond with an output port ready reply, the first process 300 continues to a 'return TRUE' step 313 that indicates trigger satisfied to the 'trigger satisfied' decision step 207.

The 'received ready sufficient' decision step 307 can be based on a specified percentage of the specified set of output ports, a specified total number of responding output ports, or other value that can be used to balance the unicast packet traffic with the multicast packet traffic through the packet switch such to maximize, in heavy packet traffic situations, the utilization of the available bandwidth of the packet switch. The first process 300 works for a lightly loaded packet switch because the switch bandwidth is already underutilized. Thus, the lost bandwidth utilization due to switching to the multicast preference state is insignificant. The first process 300 works for a heavily loaded packet switch because the lost bandwidth utilization due to switching to the multicast preference state is delayed until multiple multicast packets are blocked at the input ports. Thus, this lost bandwidth utilization is amortized over the each multicast packet sent during a burst of multicast packets.

Figure 3B:
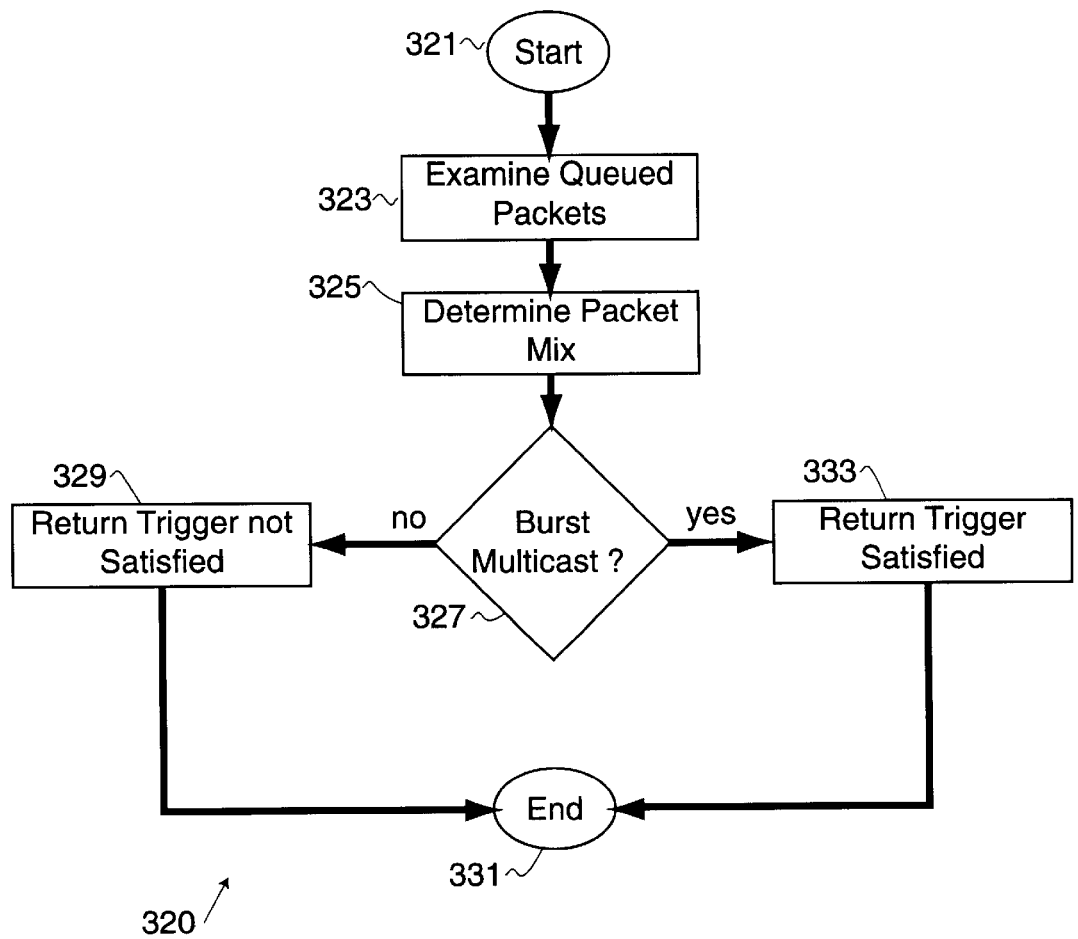
FIG. 3B illustrates a second embodiment of the 'determine state trigger condition' step shown in FIG. 2.

FIG. 3B illustrates a second 'determine state trigger condition' process, indicated by general reference character 320, that can be used by the 'determine state trigger condition' step 205. This embodiment examines the contents of the packets in the input queue(s), determines the mix of multicast and unicast packets in the queue(s), and enables a multicast burst dependent on the determined mix. The second process 320 initiates at a 'start' terminal 321 from the 'determine state trigger condition' step 205 of FIG. 2. The second process 320 continues to an 'examine queued packets' step 323 that examines the contents of the packets in the input queues. A 'determine packet mix' step 325 evaluates the information acquired by the 'examine queued packets' step 323 to determine the unicast/multicast mix of the queued packets. One embodiment examines the input packets at the head of the queue to determine whether these packets are multicast or unicast (used to determine the packet mix). Another embodiment examines the contents of a queue to determine whether there are adjacent sequences of multicast packets in the queue (that is whether a queue contains a first multicast pack immediately followed by another multicast packet). One aspect of the invention is to burst multiple multicast packets. The multicast packets that make up the burst can be blocking multiple input ports, be adjacent multicast packets queued to a single input port, or be some combination of packets that allows a burst of multicast packets to be transferred from the input ports to the output ports while the packet switch is in the multicast preference state.

A 'burst multicast' decision step 327 determines from the mix whether the second process 320 is to satisfy the 'trigger satisfied' decision step 207. If an insufficient number of multicast packets are ready for burst transmission the second process 320 continues to a 'return FALSE' step 329 and exits through an 'end' terminal 331. However, if a sufficient number of multicast packets are ready for burst transmission the second process 320 continues to an 'return TRUE' step 333 and completes through the 'end' terminal 331

Figure 3C:
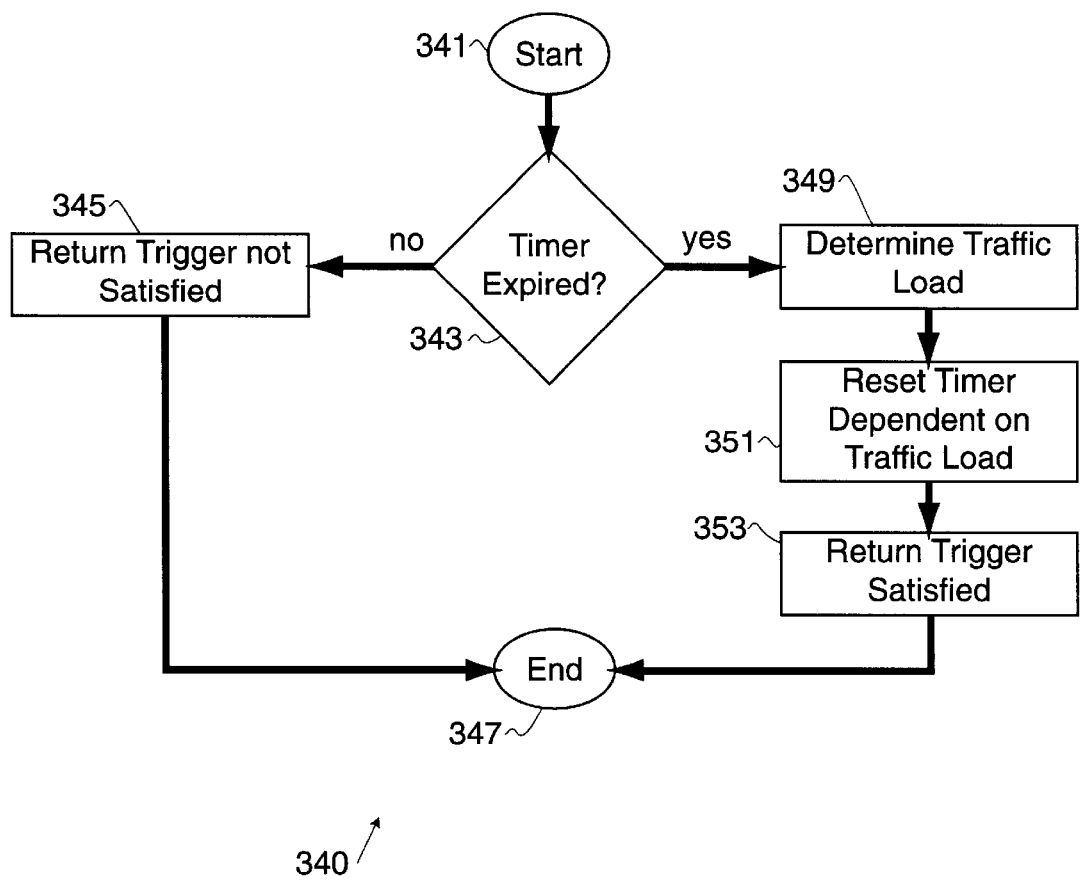
FIG. 3C illustrates another embodiment of the 'determine state trigger condition' step shown in FIG. 2.

FIG. 3C illustrates a third 'determine state trigger condition' process, indicated by general reference character 340, that again is initiated from the 'determine state trigger condition' step 205 of FIG. 2. at a 'start' terminal 341. The third process 340 continues to a 'timer expired' decision step 343 that detects whether the timer has expired. If the timer has not expired the third process 340 continues to a 'return FALSE' step 345 and completes through an 'end' terminal 347. However, if the timer has expired, the third process 340 continues to a 'determine traffic load' step 349. The 'determine traffic load' step 349 can use the previously described techniques (such as the 'request output ports' step 303 and the 'receive output port ready' step 305; and the 'examine queued packets' step 323 and the 'determine packet mix' step 325) to determine the packet traffic load value representing the packet load value through the packet switch. In addition, the 'determine traffic load' step 349 can also simply monitor the number of transfers that have occurred since the last timer expiration. The third process 340 continues to a 'reset timer step' step 351 that resets the timer based on the load determined by the 'determine traffic load' step 349. The third process 340 continues to a 'return TRUE' step 353 and completes through the 'end' terminal 347.

One skilled in the art will understand that aspects of the third process 340 can be included with the first process 300 and the second process 320 to help protect against a single multicast packet being blocked for too long a time because no other multicast packet has been received during that time. In particular, but without limitation, a timer can be used to periodically change preference mode of the packet switch if the preference mode was not changed during the running of the timer.

Figure 4:
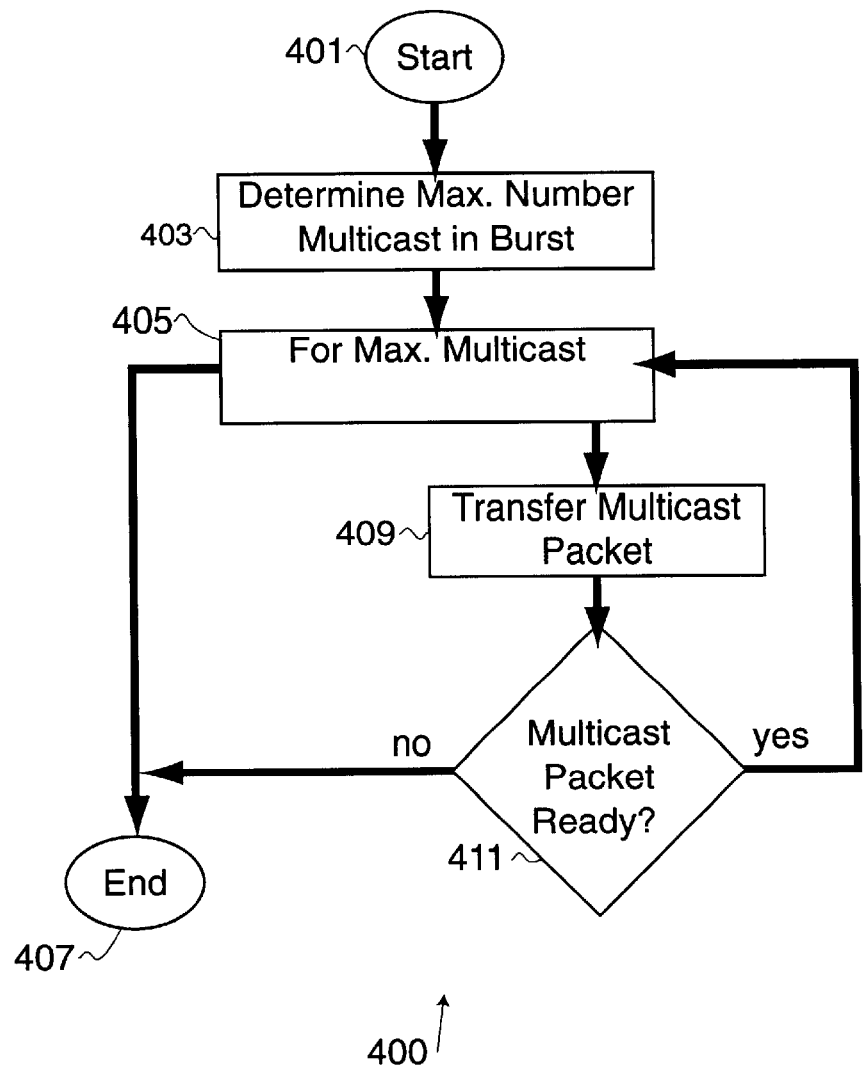
FIG. 4 illustrates a 'multicast packet transfer' step shown in FIG. 2.

FIG. 4 illustrates a multicast burst process, indicated by general reference character 400, that transfers a number of multicast packets from the input port(s) of the packet switch to the output ports. The multicast burst process 400 is initiated at a 'start' terminal 401 and is invoked by the 'burst multicast transfers' step 213 of FIG. 2. The multicast burst process 400 continues to a 'determine max burst size' step 403 that loads a specified value for the maximum number of multicast packets that are to be transferred while the packet switch is in the multicast preference state. Next, a 'loop' step 405 repeats some of the subsequent steps for the number of multicast packets in the burst. When the loop is complete, the multicast burst process 400 completes through an 'end' terminal 407.

On each iteration of the loop, a 'transfer multicast packet' step 409 transfers a multicast packet from the input port to the specified set of output ports. A 'multicast packet ready' decision step 411 then determine whether another multicast packet is ready for transfer. If no multicast packet is ready for transfer, the multicast burst process 400 completes through the 'end' terminal 407. Otherwise, the multicast burst process 400 continues to the 'loop' step 405 to continue bursting multicast packets. Thus, the multicast burst process 400 detects when the burst of multicast packets completes either by exhaustion of ready multicast packets at the input ports, or by assuring that the burst is no more than a maximum number of multicast packets (to not unduly delay unicast packet processing).

Because the burst of multicast packets does not require the packet switch to resynchronize between each multicast packet transfer, the bandwidth of the packet switch is better utilized and the throughput of the packet switch is increased. In a preferred embodiment, a burst contains at least two and preferably four or more multicast packets.

One skilled in the art will understand that the invention improves the efficiency of a packet switch by reducing the number of multicast synchronization delays by transferring bursts of multicast packets when possible. Such a one will also understand that, although the invention has been described using variable length packets, the invention can also be applied to fixed length packets (cells).

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A method for arbitrating between one or more unicast packets and one or more multicast packets for transferal through a packet switch having a plurality of inputs and a plurality of outputs, said method comprising steps of:

(a) determining a state switch trigger condition while said packet switch is in a first state, said first state being such that said packet switch preferentially transfers said one or more unicast packets from said plurality of inputs to said plurality of outputs, said state switch trigger condition including a sufficient number of multicast packets;

(b) switching from said first state to a second state responsive to said state switch trigger condition, said second state being such that said packet switch preferentially transfers some portion of a programmed number of multicast packets from said plurality of inputs to said plurality of outputs;

(c) transferring some portion of said programmed number of multicast packets up to said programmed number of multicast packets from said plurality of inputs to said plurality of outputs;

(d) switching from said second state to said first state responsive to completion of said step of transferring.

2. The method of claim 1, further including the step of repeating steps (a–d).

3. The method of claim 1, wherein the step of determining is responsive to an evaluation of the mix of said one or more unicast packets and said one or more multicast packets at said plurality of inputs.

4. The method of claim 1, wherein said packet switch includes at least one input queue and the step of determining further includes steps of:

examining one or more queued packets at said at least one input queue; and determining the mix of said one or more unicast packets and said one or more multicast packets in said at least one input queue.

5. The method of claim 1, wherein said packet switch includes a timer and the step of determining further includes detecting expiration of said timer.

6. The method of claim 5, further including resetting said timer dependent on the mix of said one or more unicast packets and said one or more multicast packets.

7. The method of claim 5, further including resetting said timer dependent on a packet traffic load value of said packet switch.

8. The method of claim 1, wherein the first state is a unicast preference state and said second state is a multicast preference state.

9. An apparatus for arbitrating between one or more unicast packets and one or more multicast packets for transferal through a packet switch having a plurality of inputs and a plurality of outputs, said apparatus comprising:

a trigger determination mechanism configured to determine a state switch trigger condition while said packet switch is in a first state, said first state being such that said packet switch preferentially transfers said one or more unicast packets from said plurality of inputs to said plurality of outputs, said state switch trigger condition including a sufficient number of multicast packets;

a first state transition mechanism configured to switch said packet switch from said first state to a second state responsive to said state switch trigger condition determined by the trigger determination mechanism, said second state being such that said packet switch preferentially transfers some portion of a programmed number of multicast packets from said plurality of inputs to said plurality of outputs;

a multicast packet transfer mechanism configured to transfer said some portion of multicast packets up to said programmed number of multicast packets from said plurality of inputs to said plurality of outputs while said packet switch is in said second state; and a second state transition mechanism configured to switch from said second state to said first state responsive to the multicast transfer mechanism completing said some portion of multicast packets.

10. The apparatus of claim 9, wherein the trigger determination mechanism is responsive to an evaluation mechanism that is responsive to the mix of said one or more unicast packets and said one or more multicast packets at said plurality of inputs.

11. The apparatus of claim 9, wherein said packet switch includes at least one input queue and the trigger determination mechanism further includes:

a packet examination mechanism configured to examine one or more queued packets at said at least one input queue; and a packet mix determination mechanism configured to determine the mix of said one or more unicast packets and said one or more multicast packets in said at least one input queue responsive to the packet examination mechanism.

12. The apparatus of claim 9, wherein said packet switch includes a timer and the trigger determination mechanism further includes a timer expiration detection mechanism.

13. The apparatus of claim 12, further including a timer reset mechanism configured to reset said timer dependent on the mix of said one or more unicast packets and said one or more multicast packets.

14. The apparatus of claim 12, further including a timer reset mechanism configured to reset said timer dependent on a packet traffic load value of said packet switch.

15. The apparatus of claim 9, wherein said first state is a unicast preference state and said second state is a multicast preference state.

16. A method for arbitrating between one or more unicast packets and one or more multicast packets for transferal through a packet switch having a plurality of inputs and a plurality of outputs, said method comprising steps of:

determining a state switch trigger condition while said packet switch is in a first state, said first state being such that said packet switch preferentially transfers said one or more unicast packets from said plurality of inputs to said plurality of outputs, said packet switch including a timer wherein said step of determining further includes expiration of said timer;

switching from said first state to a second state responsive to said state switch trigger condition, said second state being such that said packet switch preferentially transfers said one or more multicast packets from said plurality of inputs to said plurality of outputs;

transferring said one or more multicast packets from one or more of said plurality of inputs to said plurality of outputs;

switching from said second state to said first state responsive to said step of transferring; and resetting said timer dependent on a packet traffic load value of said packet switch.

17. An apparatus for arbitrating between one or more unicast packets and one or more multicast packets for transferal through a packet switch having a plurality of inputs and a plurality of outputs, said apparatus comprising:

a trigger determination mechanism configured to determine a state switch trigger condition while said packet switch is in a first state, said first state being such that said packet switch preferentially transfers said one or more unicast packets from said plurality of inputs to said plurality of outputs, said packet switch including a timer mechanism wherein said determination mechanism is responsive to expiration of said timer mechanism;

a first state transition mechanism configured to switch said packet switch from said first state to a second state responsive to said state switch trigger condition determined by the trigger determination mechanism, said second state being such that said packet switch preferentially transfers said one or more multicast packets from said plurality of inputs to said plurality of outputs;

a multicast transfer mechanism configured to transfer said one or more multicast packets from one or more of said plurality of inputs to said plurality of outputs while said packet switch is in said second state;

a second state transition mechanism configured to switch from said second state to said first state responsive to the multipacket transfer mechanism; and resetting said timer mechanism dependent on a packet traffic load value of said packet switch.

18. A computer-readable medium carrying one or more sequences of instructions for arbitrating between one or more unicast packets and one or more multicast packets for transferal through a packet switch having a plurality of inputs and a plurality of outputs, wherein when said instructions are executed by one or more processors the instructions cause one or more processors to perform the steps of:

(a) determining a state switch trigger condition while said packet switch is in a first state, said first state being such that said packet switch preferentially transfers said one or more unicast packets from said plurality of inputs to said plurality of outputs, said state switch trigger condition including a sufficient number of multicast packets;

(b) switching from said first state to a second state responsive to said state switch trigger condition, said second state being such that said packet switch preferentially transfers some portion of a programmed number of multicast packets from said plurality of inputs to said plurality of outputs;

(c) transferring some portion of said programmed number of multicast packets up to said programmed number of multicast packets from said plurality of inputs to said plurality of outputs;

(d) switching from said second state to said first state responsive to completion of said step of transferring.

19. A computer-readable medium as recited in claim 18, further comprising instructions which, when executed by the one or more processors, cause the one or more processors to carry-out the step of repeating steps (a–d).

20. A computer-readable medium as recited in claim 18, wherein the step of determining is responsive to an evaluation of the mix of said one or more unicast packets and said one or more multicast packets at said plurality of inputs.

21. A computer-readable medium as recited in claim 18, wherein said packet switch includes at least one input queue and the step of determining further includes steps of:

examining one or more queued packets at said at least one input queue; and determining the mix of said one or more unicast packets and said one or more multicast packets in said at least one input queue.

22. A computer-readable medium as recited in claim 18, wherein said packet switch includes a timer and the step of determining further includes detecting expiration of said timer.

23. A computer-readable medium as recited in claim 22, further comprising instructions which, when executed by the one or more processors, cause the one or more processors to reset said timer dependent on the mix of said one or more unicast packets and said one or more multicast packets.

24. A computer-readable medium as recited in claim 22, further comprising instructions which, when executed by the one or more processors cause the one or more processors to reset said timer dependent on a packet traffic load value of said packet switch.

25. A computer-readable medium as recited in claim 18, wherein the first state is a unicast preference state and said second state is a multicast preference state.

26. A computer-readable medium carrying one or more sequences of instructions for arbitrating between one or more unicast packets and one or more multicast packets for transferal through a packet switch having a plurality of inputs and a plurality of outputs, wherein when said instructions are executed by one or more processors, the instructions cause one or more processors to perform the steps of:

determining a state switch trigger condition while said packet switch is in a first state, said first state being such that said packet switch preferentially transfers said one or more unicast packets from said plurality of inputs to said plurality of outputs, said packet switch including a timer wherein said step of determining further includes expiration of said timer;

switching from said first state to a second state responsive to said state switch trigger condition, said second state being such that said packet switch preferentially transfers said one or more multicast packets from said plurality of inputs to said plurality of outputs;

transferring said one or more multicast packets from one or more of said plurality of inputs to said plurality of outputs;

switching from said second state to said first state responsive to said step of transferring; and resetting said timer dependent on a packet traffic load value of said packet switch.

* * * * *